C. J. KLEIN.
CASING FOR PENDENT SWITCHES AND THE LIKE.
APPLICATION FILED DEC. 18, 1913.

1,280,115. Patented Sept. 24, 1918.

Witnesses
J. L. Johnson
H. Wilson

Inventor
Charles J. Klein
By Edwin B. Stower, Jr.
Attorney

UNITED STATES PATENT OFFICE.

CHARLES J. KLEIN, OF MILWAUKEE, WISCONSIN, ASSIGNOR TO THE CUTLER-HAMMER MFG. CO., OF MILWAUKEE, WISCONSIN, A CORPORATION OF WISCONSIN.

CASING FOR PENDENT SWITCHES AND THE LIKE.

1,280,115.   Specification of Letters Patent.   Patented Sept. 24, 1918.

Continuation in part of application Serial No. 717,065, filed August 26, 1912. This application filed December 18, 1913. Serial No. 807,456.

*To all whom it may concern:*

Be it known that I, CHARLES J. KLEIN, a citizen of the United States, residing at Milwaukee, in the county of Milwaukee and State of Wisconsin, have invented new and useful Improvements in Casings for Pendent Switches and the like, of which the following is a full, clear, concise, and exact description, reference being had to the accompanying drawing, forming a part of this specification.

This invention relates to casings for pendent switches, lamp sockets and similar devices.

One of the objects of the invention is to provide an improved casing especially adapted for a switch mechanism having a reciprocable operating member.

A further object is to provide an improved casing wherein the shell member comprises a plurality of parts capable of assembly about a switch or similar device.

Further objects will appear hereinafter.

In order that my invention may be more clearly understood, I have illustrated two preferred embodiments thereof in the accompanying drawing. It is to be understood, however, that the forms shown are susceptible of modification without departing from the scope of the appended claims.

Figure 1:
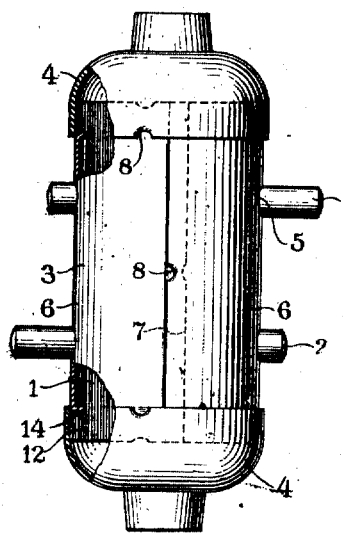
Figure 1 is a side view of a pendent switch casing of the feed-through type.

This application is a continuation of my application filed August 26, 1912, Serial No. 717,065, as to all the common subject-matter of the two applications.

An insulating base 1 is arranged to carry one or more snap switch mechanisms having reciprocable operating members 2. The casing for the switch comprises a cylindrical shell 3 and a pair of caps 4 detachably fitting over the ends of the shell. In order that the shell 3 may snugly inclose the base and switch, and for other purposes, the same is longitudinally divided and provided with oppositely disposed apertures 5 to receive the switch operating members 2.

Figure 2:
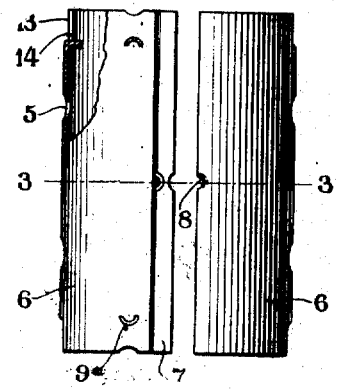
Fig. 2 is a similar view of the parts of the casing shell when separated.
Figure 3:
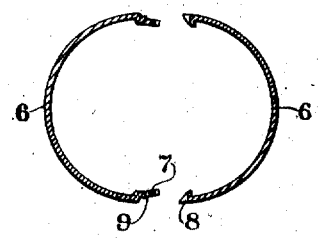
Fig. 3 is a sectional view on the line 3—3 of Fig. 2.

In the casing of Figs. 1, 2, and 3 the shell 3 is longitudinally divided on opposite sides and thus comprises two semi-cylindrical sections 6. One section is preferably provided on its longitudinal edges with depressed portions 7 whereby the two parts may be assembled with the portions 7 fitting within the other part of the shell.

The caps 4 are designed to telescope over the ends of the shell, and interlocking means are provided to releasably lock the same together. When thus assembled the caps also serve to hold the two parts of the shell against separation.

In order to additionally lock together the two parts of the shell 3 and to prevent their relative movement when the caps are removed, interlocking means are provided therefor on the overlapping longitudinal edges. This interlocking means preferably comprises catches 8 and shoulders 9 of the form described and claimed in my co-pending application, filed December 18, 1913, Serial No. 807,455. Briefly described, each catch comprises a substantially segmental portion of one part crimped inwardly to provide a hooked wall 10 and tapered side walls 11, while the shoulder 9 in practice comprises an arc-shaped opening in the other part of the shell. When the parts of the shell are united the catches and shoulders coöperate to effectually lock the parts against longitudinal and transverse movement in both directions. Moreover, this interlocking means performs an additional function when thus applied to the sides of the shell. The arched wall of the catch 8 enters the curved opening in the shell to provide a hinge-like lock, that is, the shell may be compressed at either end sufficiently to release the caps 4 without releasing or weakening the intermediate lock between the two parts of the shell. The interlocking means between the cap and shell is thus releasable independently of the interlocking means between the parts of the shell, though both coöperate to hold the latter together.

Figure 4:
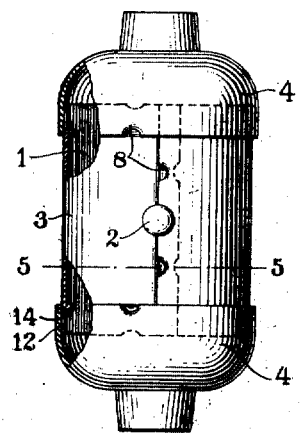
Fig. 4 is a side view of a modified form of casing.
Figure 5:
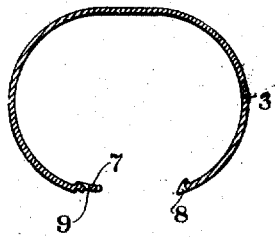
Fig. 5 is a sectional view on the line 5—5 of Fig. 4.
Figure 6:
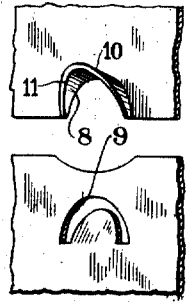
Fig. 6 is an enlarged perspective of a portion of the casing provided with one set of interlocking means.

In the casing of Figs. 4 and 5, the shell is longitudinally split on only one side and is provided with an opening opposite the line of division and complementary recesses on the line of division to receive the operating member 2 of the switch. In this embodiment the shell is designed to be resiliently spread so that the switch may be inserted laterally therein. A pair of interlocking means is preferably provided above and below the switch button 2, the operation of which in this embodiment remains similar to that already described.

The base 1 is provided on opposite sides of each end with extensions 12 and the parts of the shell are provided with corresponding marginal slots 13 for receiving the extensions 12 to support the base within the casing and thereby insuring against relative longitudinal movement of the base when the parts of the casing are assembled thereabout. In order to provide a more substantial support for the base the metal of the shell is preferably bent inward, as at 14, at one or more sides of the slots 13.

What I claim as new and desire to secure by Letters Patent is:

1. The combination with a push button switch, of a cylindrical resilient shell to inclose said switch, said shell having a push button opening and being split longitudinally to permit spreading thereof to receive said switch and a cap to fit the end of said shell to secure the latter about said switch.

2. The combination with a push button switch, of a cylindrical inclosing shell therefor of resilient material, said shell being split longitudinally into separate sections to be assembled about said switch, said sections having interfitting parts to secure the same in assembled relation and caps fitting the ends of said shell to further secure said sections together.

3. The combination with a push button switch, of a cylindrical resilient shell to inclose said switch, said shell being split longitudinally to permit spreading thereof to receive said switch and being provided with an anti-spread catch utilizing the resiliency of said shell for spring action thereof.

4. The combination with a push button switch, of a cylindrical shell of resilient material split longitudinally to be fitted about said switch, said shell normally having its longitudinal edges overlapped and having an anti-spread catch for such overlapped edges utilizing the resiliency of said shell for snap action of said catch and removable end caps for said shell.

5. The combination with a push button switch, of a cylindrical shell comprising separate semi-cylindrical sections to be assembled about said switch with one section overlapping opposite edges of the other, one of said sections having shoulders to interlock with shoulders on the other and being resilient to effect interlock of said shoulders upon assembly of said sections to thereby lock the same together and end caps for said shell.

In witness whereof, I have hereunto subscribed my name in the presence of two witnesses.

CHARLES J. KLEIN.

Witnesses:
L. A. WATSON,
F. H. HUBBARD.